W. A. PARR.
HORSE COLLAR.
APPLICATION FILED APR. 5, 1915.
1,153,852.
Patented Sept. 14, 1915.
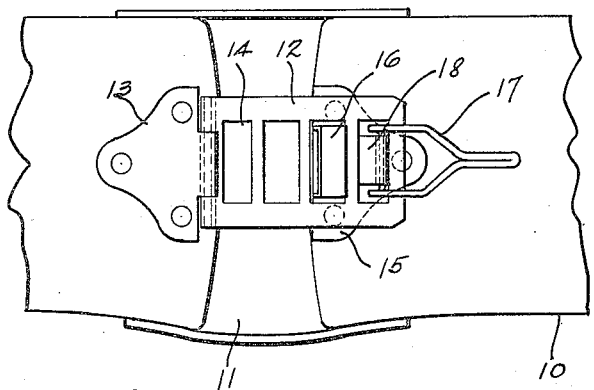
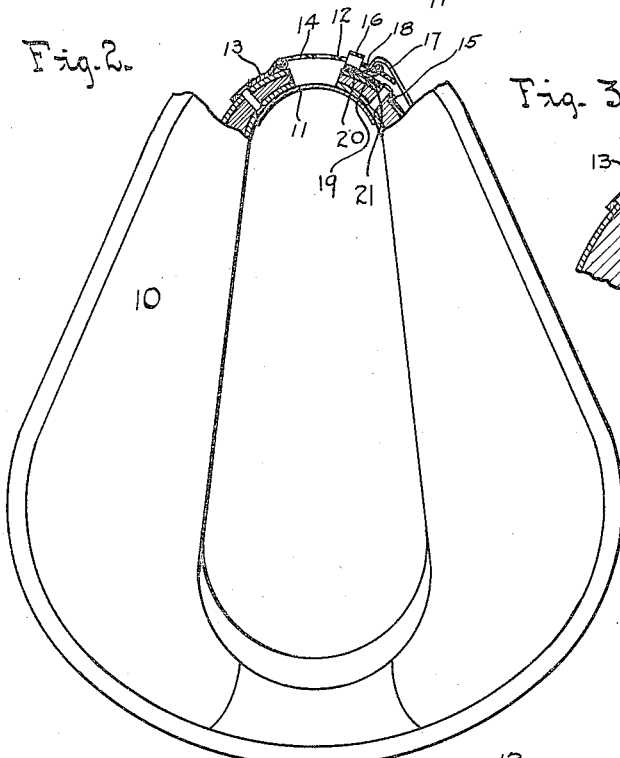
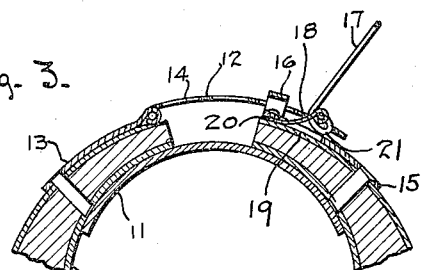
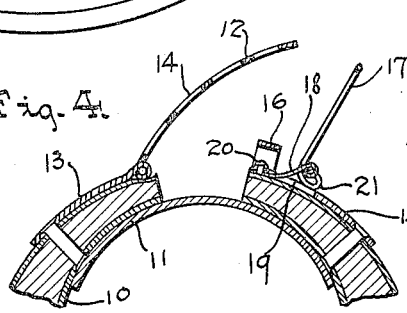
WITNESSES:
INVENTOR
WEBSTER A. PARR
BY
ATTORNEY

UNITED STATES PATENT OFFICE.

WEBSTER A. PARR, OF INDIANAPOLIS, INDIANA, ASSIGNOR, BY MESNE ASSIGNMENTS, OF ONE-HALF TO GERTRUDE E. PARR AND ONE-HALF TO LILLIAN M. COONS, BOTH OF INDIANAPOLIS, INDIANA.

HORSE-COLLAR.

1,153,852.　　　　Specification of Letters Patent.　　Patented Sept. 14, 1915.

Application filed April 5, 1915.　Serial No. 19,264.

*To all whom it may concern:*

Be it known that I, WEBSTER A. PARR, a citizen of the United States, and a resident of Indianapolis, county of Marion, and State of Indiana, have invented a certain new and useful Horse-Collar; and I do hereby declare that the following is a full, clear, and exact description thereof, reference being had to the accompanying drawings, in which like letters refer to like parts.

The object of this invention is to hold the upper ends of horse collars in absolutely unchangeable position relative to each other, so that it will be impossible for the upper end of the horse collar to contract, expand or the ends thereof to have movement longitudinally of the horse's neck independently of each other.

In horse collars as heretofore usually made and used, the upper ends of the collar are held together by leather straps buckled to the collars which limit their separating movement, but do not prevent the ends of the collar from moving toward each other or being forced toward each other by the hames and pinching, wearing and injuring the horse's neck. Furthermore, with such collars it is quite common for one of the upper ends of the collar to move in advance or to the rear of the other upper end of the collar so that the action of the two sides of the collar on the horse's neck would be different.

This invention overcomes all of the foregoing difficulties and enables the relative positions of the upper ends of the collars to be adjusted, but after they have been adjusted, they will be maintained absolutely in their adjusted positions so that they cannot be forced toward each other or away from each other transversely or be twisted, or one end move in advance or to the rear of the other. In other words, the form, shape and fit of the upper end of the collar on the horse's neck, after adjustment thereof, will never vary to the slightest degree. Also the upper ends of the collar cannot twist as usual. Furthermore the bearing of the upper part of the collar on the horse's neck will always be maintained at the full width of the collar so as not to cut or injure the neck, and the straps connecting the upper ends of the hames will be prevented from bearing down upon the top collar pad so as to cut the neck.

The chief feature of the invention consists in securing to one of the upper ends of the collar, by hinged connection, a very wide connecting plate with a series of rectangular spaces therein, any of which is adapted to receive a rectangular projection or loop on the other upper end of the collar and on such upper end of the collar there is also a fastener insertible through the openings in said plate for holding or clamping it down on the collar and holding the same down under tension and thus interlocking the connecting plate with said rectangular projection. Therefore, the position of the two ends of the collar can be adjusted with relation to each other and when so adjusted and the fasteners secured, the connecting plate and rectangular projection will prevent the ends from moving toward each other and away from each other to any extent and prevent any twisting or other movement of the upper end of the collar, as above explained. In other words, with this connection the upper end of the collar is substantially as rigid as the lower end.

The full nature of the invention will be understood from the accompanying drawings and the following description and claims.

In the drawings, Figure 1 is a plan view of the upper part of the collar fastened together. Fig. 2 is an elevation of the collar with parts broken away showing a central vertical section of the upper portion thereof, with the ends fastened together. Fig. 3 is the upper part of Fig. 2 with the parts in process of unfastening. Fig. 4 is the same with the parts unfastened.

There is shown herein a horse collar 10 of any ordinary form with a top neck pad 11 of usual form. The means for fastening the top ends of the collar together consists of a connecting metal plate 12 hinged at one end to a plate 13 which is secured to one upper end of the collar. The plate is long enough to overlap the other end of the collar and said plate has in it a series of rectangular recesses 14.

On the other upper end of the collar there is secured a metal plate 15 with its upper end flush with the upper end of the collar and near the upper end of said plate there is a rectangular projection 16 which is shown herein in the form of a loop and which is adapted to enter in one of the recesses 14 of the connecting plate and is nearly as large as said recesses so that when the connecting plate is interlocked with said projection 16, there can be no relative play or movement of any kind between the upper ends of the collar, excepting possibly some independent vertical play, which movement of the sides of the collar, however, is usually prevented by the hames. In other words, such interlocking members 12 and 16 will prevent the ends of the collar from moving toward or away from each other or prevent any twisting movement of the upper part of the collar or one upper end being in advance of another upper end of the collar. Said connecting plate 12 is held in interlocking engagement with said projection 16 by a clamping lever 17 made preferably of heavy steel wire fulcrumed in the end of a flat steel spring 18 which extends through a slot 19 in said plate 15 and is secured to the underside of said plate 15 by rivets 20. This mounting of the spring 18 prevents any twisting movement of said spring. The catch lever 17 is fulcrumed between its ends to said spring 18 and it is formed L-shape so as to have inward extensions 21 adapted to have three functions. They engage the plate 15 when the catch lever 17 is closed for holding it closed and in locking position, and also to hold said catch lever in its open position. The spring plate 18, however, coöperates with said extensions 21 in accomplishing this function for as said catch lever 17 is opened or closed, the free end of the spring is elevated or lowered correspondingly. The fulcrum of the catch lever 17 to the spring 18 is at such distance from the projection 16 that one recess of the plate 12 will fit astride the catch lever 17 and spring when the adjacent recess in said plate 12 will fit astride and interlock with the rectangular projection 16.

A second function of the extensions 21 of the catch lever is to coöperate with the rectangular projection 16 in holding the connecting plate 12 in place. In other words, two means for interlocking said connecting plate are provided, one being the projection 16 and the other the extensions 21 of the catch lever. They simultaneously stop and limit any tendency of said plate 12 to move in any direction. Another function of said extensions 21 of the catch lever is to engage the under side of the plate 12 as the catch lever is being released so as to force said plate up and out of locking engagement with the rectangular extension 16.

The hinge connection of the plate 12 at the two sides of the fixed plate 13 as well as the interlocking of said plate 12 with both the rectangular projection 16 and the extensions 21 on the catch lever 17, absolutely prevents the upward ends of the collar from having any twisting movement whatever and makes a very strong connection and holds the hames strings all together out of engagement with the upper part of the collar and maintain the form and shape of the upper end of the collar at all times and under all conditions of use. There is no chance for it to pinch the horse's neck by any relative movements of the ends of the collar and when it is adjusted to suit the thickness of the upper part of the neck of the horse, the collar will be maintained in that condition until readjusted.

The invention claimed is:

1. The combination with the upper ends of a horse collar, of a connecting plate hinged to one end of the collar and having a series of recesses therein, a projecting member rigidly secured to the other end of the collar which projects through and fits snugly in any one of said recesses in the connecting plate, and clamping lever secured to said last-mentioned end of the collar which is adapted to extend through one of said recesses in the connecting plate and clamp it in locking position.

2. The combination with the upper ends of a horse collar, of a connecting plate hinged to one end of the collar and having a series of recesses therein, a projecting member rigidly secured to the other end of the collar which projects through and fits snugly in any one of said recesses in the connecting plate, and a fastening lever mounted in connection with said last-mentioned end of the collar and in such relation to the projecting member that said fastening and projecting member will project through adjacent recesses in said connecting plate and said fastening lever will not only clamp the connecting plate down in locking position, but will coöperate with said projecting member to prevent any relative movement of said connecting plate.

3. The combination with the upper ends of a horse collar, of a connecting plate hinged to one end of the collar and having a series of recesses therein, a projecting member rigidly secured to the other end of the collar which projects through and fits snugly in any one of said recesses in the connecting plate, and a clamping lever secured to said last-mentioned end of the collar and which is adapted to extend through one of said recesses in the connecting plate and clamp it in locking position, said fastening lever having inward extensions arranged so as to elevate and release said connecting plate when the fastening lever is being released.

4. The combination with the upper ends of a horse collar, of a connecting plate hinged to one end of the collar and having a series of recesses therein, a projecting member rigidly secured to the other end of the collar which projects through and fits snugly in any one of said recesses in the connecting plate, a spring plate secured to said last-mentioned end of the collar, and a fastening lever fulcrumed between its ends to said spring plate and adapted to extend through the recess in the connecting plate which is adjacent to the recess through which said projecting member extends for clamping the connecting plate down in locking position and the inner ends of said fastening lever are adapted to coöperate with said spring and hold said fastener in either its locking position or its released position.

5. The combination with the upper ends of a collar, of a metal plate secured to each of said ends, a connecting plate hinged to one of said plates and having a series of rectangular recesses therein, a rectangular projection secured to the plate on the other end of the collar adapted to extend through and fit snugly in any of said recesses in the connecting plate, a spring plate extending through a recess in the plate secured to the last-mentioned end of the collar and secured to the underside of said plate, and a fastening lever fulcrumed between its ends in the end of said spring plate in position to extend through the recess in said connecting plate which is adjacent to the recess through which said rectangular projection extends and said fastening lever having on its inner ends angular extensions which engage the metal plate to which said spring is secured so as to hold said fastening lever in its open or closed position and to release said connecting plate when said fastening lever is being released.

In witness whereof, I have hereunto affixed my signature in the presence of the witnesses herein named.

WEBSTER A. PARR.

Witnesses:
J. H. WELLS,
MABEL HEINOLD.

Copies of this patent may be obtained for five cents each, by addressing the "Commissioner of Patents, Washington, D. C."